United States Patent [19]

Mori

[11] Patent Number: 4,809,675
[45] Date of Patent: Mar. 7, 1989

[54] SOLAR RAY COLLECTING DEVICE

[76] Inventor: Kei Mori, 3-16-3-501, Kaminoge, Setagaya-ku, Tokyo, Japan

[21] Appl. No.: 95,741

[22] Filed: Sep. 11, 1987

[30] Foreign Application Priority Data

Sep. 18, 1986 [JP] Japan .................................. 61-219964

[51] Int. Cl.[4] .............................................. F24J 2/38
[52] U.S. Cl. .................................... 126/425; 126/438; 126/440
[58] Field of Search .............. 126/417, 418, 419, 438, 126/440, 450; 350/96.1

[56] References Cited

U.S. PATENT DOCUMENTS

| | | | |
|---|---|---|---|
| 3,892,433 | 7/1975 | Blake ................................ | 126/425 X |
| 4,000,733 | 1/1977 | Pauly ................................. | 126/440 |
| 4,201,197 | 5/1980 | Dismer .............................. | 126/440 |
| 4,257,401 | 3/1981 | Daniels .............................. | 126/440 |
| 4,282,858 | 8/1981 | Bowes, Jr. ......................... | 126/440 |
| 4,294,232 | 10/1981 | Boy-Marcotte et al. ........... | 126/450 |
| 4,477,145 | 10/1984 | Mori ................................... | 126/440 |
| 4,519,382 | 5/1985 | Gerwin .............................. | 126/425 |
| 4,541,415 | 9/1985 | Mori ................................... | 126/440 |
| 4,586,488 | 5/1986 | Noto ................................... | 126/438 |
| 4,730,602 | 3/1988 | Posnansky et al. ................ | 126/425 |

FOREIGN PATENT DOCUMENTS

| | | | |
|---|---|---|---|
| 0068750 | 6/1981 | Japan ................................. | 126/440 |
| 0123056 | 7/1983 | Japan ................................. | 126/440 |

Primary Examiner—Randall L. Green
Attorney, Agent, or Firm—Jordan and Hamburg

[57] ABSTRACT

A solar ray collecting device comprises a light ray collecting device and a light ray reflecting device. The light ray collecting device comprises an optical lens and an optical conductor cable which has a light-receiving end placed at the light-focusing position of the optical lens and transmits the light energy arriving at the optical lens. The light ray reflecting device is located at a position apart from the light ray collecting device for reflecting the solar rays and for focusing the same onto the light ray collecting device.

2 Claims, 3 Drawing Sheets

SOLAR RAY COLLECTING DEVICE

BACKGROUND OF THE INVENTION

The present invention relates to a solar ray collecting device in which a light ray collecting device and a light reflecting device are effectively imcorporated. The light ray collecting device is fixedly mounted in a position for collecting light energy through an optical conductor cable having a light-receiving end located at the focal position of the optical lens and a light reflecting device is placed apart therefrom without intercepting the solar rays for the purpose of enabling them to enter. The solar rays reflected by the reflecting device are transmitted to the light ray collecting device, and thereby the light ray collecting device can also be placed where no solar rays can enter.

An automatic solar ray collecting device previously proposed by the present applicant has a cylindrical foundation and a transparent dome-shaped head portion. A capsule of the solar ray collecting device is constructed with the foundation and the head portion. As to the employment of the device, a solar ray collecting assembly device is accommodated in the capsule.

The solar ray collecting assembly device comprises a large number of optical lenses (for instance, nineteen lenses) for focusing the sun's ray, a light ray direction sensor for sensing the direction of the sun, a support frame for unitarily holding the lenses and the sensor, a first motor for rotating those elements with a rotatable shaft (horizontally arranged shaft), a support arm for supporting the afore-mentioned elements from the lenses to the motor, another rotatable shaft disposed (vertically arranged shaft) so as to intersect the rotatable shaft of the afore-mentioned motor perpendicularly thereto, and a second motor for rotating the rotatable shaft (vertically arranged shaft). The direction of the sun is sensed by the afore-mentioned light ray direction sensor. The first and second motors are controlled by means of control devices so as to always direct the lenses toward the sun. The light-receiving end of the optical conductor cable is placed at the focal position of the lenses. The light rays are guided into the optical conductor cable and transmitted therethrough onto the optional desired place.

The afore-mentioned solar ray collecting device is always installed on level ground which receives the sun's rays or on the rooftops of buildings. However, the efficiency of land utilization must be improved due to a sudden rise in the price of land in recent years and therefore the tendency of tremendously increasing the number of high rise buildings will proceed in urban districts. As a result newly constructed buildings will cast shadows on the solar ray collecting devices previously installed, so that the devices will not collect the solar rays and its efficiency will be lowered. It is a matter to be settled arising from such developments.

SUMMARY OF THE INVENTION

It is an object of the present invention to provide a solar ray collecting device comprising of a light ray collecting device and a light ray reflecting device in which the light ray reflecting device is located at a position apart from the light ray collecting device for reflecting the solar rays and for focusing the same onto the light ray collecting device.

It is another object of the present invention to provide a solar ray collecting device comprising of a light ray collecting device and a light ray reflecting device in which the solar rays reflected by the light reflecting device are transmitted to the light ray collecting device, and thereby the light ray collecting device can also be placed where no solar rays can enter.

It is another object of the present invention to provide a solar ray collecting device comprising of a light ray collecting device and a light ray reflecting device in which even though the solar rays don't arrive at the place for installation of the light ray collecting device for a long time, the reflected light rays from the light ray reflecting device can be received by the light ray collecting device.

The above-mentioned features and other advantages of the present invention will be apparent from the following detailed description which goes with the accompanying drawings.

DESCRIPTION OF THE PREFERRED EMBODIMENTS

Figure 1:
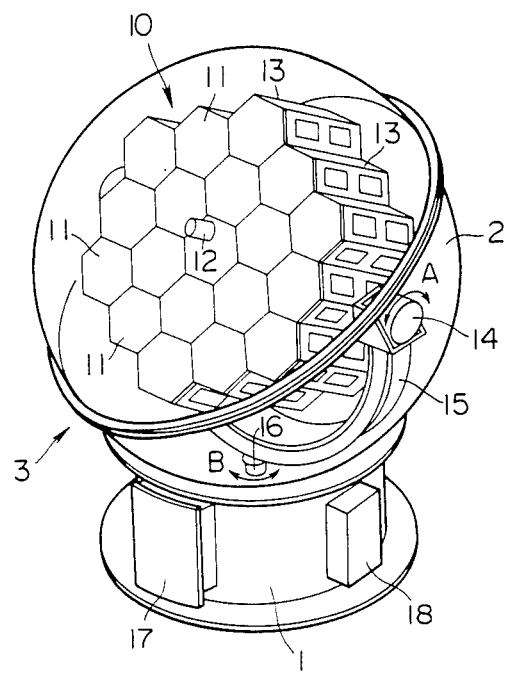
FIG. 1 is a view showing a conventional light ray collecting device.

FIG. 1 is a perspective view for explaining an embodiment of an automatic solar ray collecting device previously proposed by the present applicant. In FIG. 1, 1 is a cylindrical foundation and 2 is a transparent dome-shaped head portion. A capsule 3 of the solar ray collecting device is constructed with the foundation 1 and the head portion 2. As to the employment of the device, a solar ray collecting assembly device 10 is accommodated in the capsule as shown in FIG. 1.

The solar ray collecting assembly device 10 comprises a large number of optical lenses (for instance, nineteen lenses) 11 for focusing the sun's ray, a light ray direction sensor 12 for sensing the direction of the sun, a support frame 13 for unitarily holding the lenses 11 and the sensor 12, a first motor 14 for rotating those elements in a direction shown by arrow A, a support arm 15 for supporting the afore-mentioned elements from the lenses 11 to the motor 14, a rotatable shaft 16 disposed so as to intersect the rotatable shaft of the afore-mentioned motor 14 perpendicularly thereto, and a second motor (not shown in FIG. 1) for rotating the rotatable shaft 16 in a direction shown by arrow B. The direction of the sun is sensed by the afore-mentioned light ray direction sensor 12. The first and second motors are controlled by means of control devices 17 and 18 so as to always direct the lenses 11 toward the sun. The light-receiving end of the optical conductor cable, not shown in FIG. 1, is placed at the focal position of the lenses. The light rays are guided into the optical conductor cable and transmitted therethrough onto the optional desired place.

The afore-mentioned solar ray collecting device is always installed on level ground which receives the sun's rays or on the rooftops of buildings. However, the efficiency of land utilization must be improved due to a sudden rise in the price of land in recent years and therefore the tendency of tremendously increasing the number of high rise buildings will proceed in urban districts. As a result newly constructed buildings will cast shadows on the solar ray collecting devices previously installed, so that the devices will not collect the solar rays and its efficiency will be lowered. It is a matter to be settled arising from such developments.

According to the present invention, as a means for solving the above-mentioned matter, there is installed a light ray reflecting device which reflects the solar rays on the spot, kept apart from the solar ray collecting device, and always radiated by the solar rays and always focusing the reflected solar rays onto the solar ray collecting device. Thereby, the solar rays are focused onto the solar ray collecting device continuously from sunrise to sunset.

Figure 2:
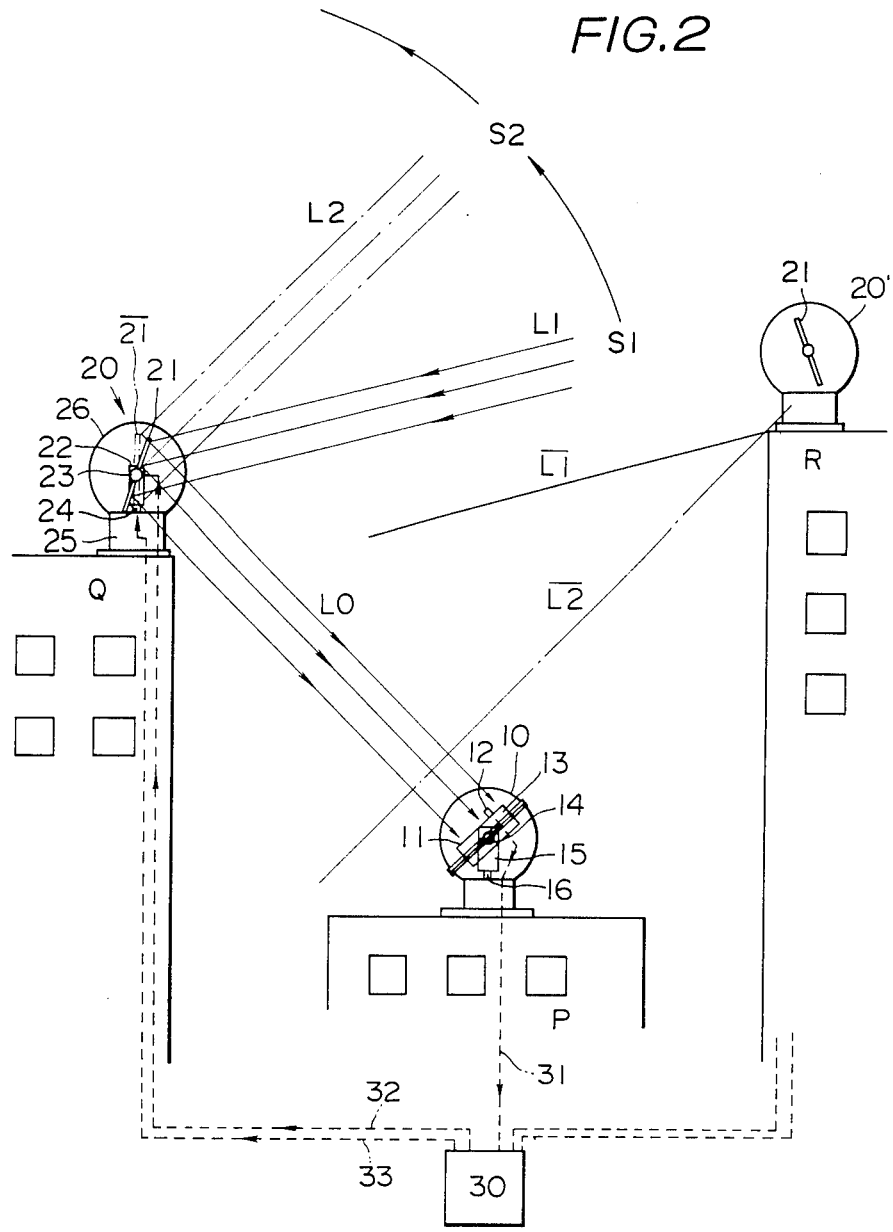
FIG. 2 is an outline view for explaining an embodiment of the present invention.

FIG. 2 is a construction view for explaining an embodiment of the present invention. The same reference numeral is attached to the same construction element as that of the prior art and the detailed explanation thereof is omitted. In the present embodiment, the solar ray collecting assembly device 10 described in the aforementioned prior art embodiment is simply called a light ray collecting device. In FIG. 2, the light ray collecting device is installed on the rooftop of a building P. Supposing that buildings Q and R, taller than building P, are newly built at both sides of building P, when solar rays are radiated in direction $S_1$ or $S_2$, building R throws its shadow on the area below $L_1$ or $L_2$ so that the solar rays don't arrive at the light ray collecting assembly device 10.

A reflecting device 20 is installed on the rooftop of building Q located opposite to R. The reflecting device 20 is constructed with a disk-shaped reflecting plate 21 having a high reflection rate (reflexibility), a drive motor 23 which rotates around the axis in the direction of the horizontal diameter of the reflecting plate 21, a semi-circular support arm 22 for pivotally supporting the shaft of the motor 23, a driving motor (not shown in FIG. 2) installed on the foundation 25 for rotating the support arm 22 around the vertical axis 24, and a transparent dome 26 for accommodating the afore-mentioned components.

The reflecting plate 21 is employed for reflecting the solar rays $L_1$ and $L_2$ thereon and for focusing the same onto the light ray collecting assembly device 10. When the sun moves from $S_1$ to $S_2$, the reflecting plate 21 is rotated from the solid line position to the dotted line position 21. Since the positional relationship of the light ray collecting assembly device 10 and the light ray reflecting device 20 is constant, the rotational angle of the reflecting plate 21 is half the angle made by a line connecting the sun $S_1$ with the reflecting plate 21 and another line connecting the sun $S_2$ with the reflecting plate 21.

The reflecting plate 21 is rotated by the motor 23 having a shaft rotating around the horizontal axis and a motor having a shaft rotating around the vertical axis. The command for the rotation is performed, for instance, as follows. Since the optical lens 11 of the light ray collecting assembly device 10 is fixed so as to face the light ray reflecting device 20, the light direction sensor 12 also faces the reflecting plate 21 at all times and senses the movement of the reflected solar rays in directions X (horizontal direction) and Y (vertical direction). The reflected solar rays are focused on a spot as a bright line signal and a light ray detector (not shown in FIG. 2) is placed so as to pick up the focus thereof. The respective light ray sensing signals of directions X and Y, generated by the light ray detector, are transmitted to a control device 30 by the use of a signal line 31. The control output signal generated therefrom is applied to the motor 23 and the other motor (not shown in FIG. 2) rotates around the vertical axis through the transmission lines 32 and 33. Then the signal drives the motors so as to rotate those motors and thereby make the respective light ray sensing signals equal to each other. And further, according to the other driving method, since the location of the sun and its height are well known all year round, if the surrounding area of the light ray collecting device is determined, the time when shadows will fall on the light ray collecting assembly device 10 can be estimated all year round and the rotation (drive) angle can be programmed accordingly.

Furthermore, when the sun rises above $S_1$ or $S_2$ and the solar rays directly arrive at the light ray collecting assembly device 10, it is not necessary to receive the reflected light rays from the light ray reflecting device 20. Since the rotational angle of the reflecting plate 21 is determined at this time, when the angular position is detected, the control device 30 puts out a command to change the signal from the light-direction sensor 12 to that of the conventional method to follow directly the sun's rays and to stop using the light ray reflecting device 20. Furthermore, when building Q throws its shadow onto the light ray collecting assembly device 10, the reflected light rays are focused onto the light ray collecting assembly device 10 through the medium of the other light ray reflecting device 20' installed on the rooftop of building R as mentioned before. In such a manner, the efficiency for utilizing the light rays can be considerably improved.

Figures 3, 4:
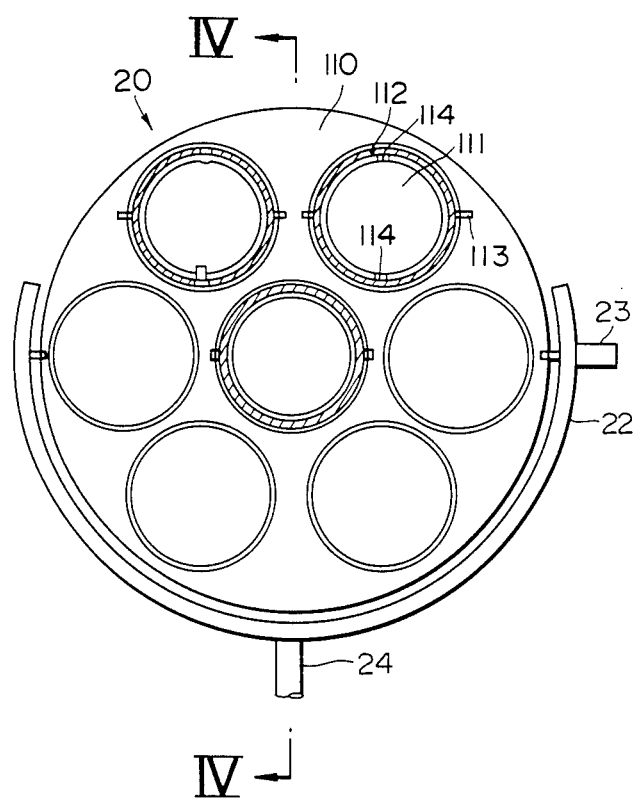
FIG. 3 is a view showing another embodiment of the light ray reflecting device.
FIG. 4 is a cross-sectional view taken along line IV—IV of FIG. 3.

FIG. 3 shows the construction of the reflecting plate intended on increase the collected light ray energy by enlarging the reflection's square measure. Several small reflecting plates 111 of similar construction are arranged on the reflecting plate 110 in a coaxial state with a ring 114 which is slightly larger than one of the respective small reflecting plates 111. The small reflecting plate 111 is fixedly attached to the ring 114 so as to rotate around a rotatable shaft 114 in a vertical direction to the ring's diameter. And further, the ring 114 is fixedly attached to the reflecting plate 110 so as to rotate in a horizontal direction to the diameter of the circular hole bored in the reflecting plate 110. The metal fixtures 1131 and 1141 are fastened and fixed in such a manner that the reflecting surfaces of each element form a paraboloid substantially for the purpose of focusing the respective light rays reflected onto the respective small reflecting plates 111 and onto the light ray collecting assembly device 10 (not shown in FIG. 3).

FIG. 4 is a cross-sectional view taken along line IV—IV of FIG. 3. The afore-mentioned rotatable portions and metal fixtures are disposed of onto the rear side which doesn't appear on the reflecting surface, as shown in FIG. 4. The reflecting plate 110, as mentioned heretofore, is rotated around the horizontal axis by the motor 23, fixedly mounted on the support arm 22, and the same is rotated around the vertical axis by the rotatable shaft 24. In FIG. 4, the small reflecting plate 111 is circular. However, plate 111 can be either square or polygonal. All things considered, anything capable of expanding the collected energy can be employed.

As mentioned heretofore, according to the present invention, even though the solar rays don't arrive at the desired place for installation of the device for a long time, the reflected light rays from the light ray reflecting device can be received. Therefore, it may be possible to gather light energy at a low cost over a long period of time. Since the reflecting plate has a reflecting rate exceeding 90%, the total amount of light energy collected effectively turns out to be considerably larger than that at the place where no light ray reflecting device is installed. This is due to the increase of time from sunrise to sunset. From the viewpoint of the effective utilization of light ray energy, the device, according to the present invention, is very useful.

I claim:

1. A solar ray collection apparatus comprising a solar ray collecting device having a plurality of optical lens and optical conductor cables having light-receiving ends located at light-focusing positions of said optical lenses, said solar ray collecting device comprising operable means to move said optical lenses to follow the sun, said optical cables transmitting said collected solar rays to a desired location, and solar ray collecting device being installed on a building structure and disposed at one elevational height, a reflector means installed on another building structure and disposed at another elevational height higher than said one elevational height, said reflector means receiving solar rays from the sun and reflecting said solar rays to said solar ray collecting device, a light ray direction sensor means mounted on said solar ray collecting device and operable to face said reflector means and sense the movement of the reflected solar rays reflected onto said sensor means and produce control signals representing said movement, control means connected between said reflector means and said solar ray collecting device, said control means being operable to receive said control signals and to cause said reflector means to follow the movement of the sun, said solar ray collecting device being operable when shaded from the sun to receive reflected solar rays from said reflector means, said control means being operable to receive said control signals from said sensor means on said solar ray collecting device and to feed said control signals to said reflector means to move said reflector means to follow the sun, said control means being operable to selectively terminate utilization of said control signals and to operatively connect said sensor means to said operable means of said solar ray collecting device so that said operable means of said solar ray collecting device receives a sensor signal from said sensor means and utilizes said sensor signal to move said optical lenses of said solar ray collecting device to follow the sun, said control means being operable to terminate utilization of said control signals when said solar ray collecting device is no longer shaded from the sun.

2. A solar ray collection apparatus according to claim 1 further comprising at least one other reflector means installed on a building structure disposed at an elevational height higher than said one elevational height, said control means being connected between said other reflector means and said solar ray collecting device, said other reflector means being operable to receive solar rays from the sun and reflect said solar rays to said solar ray collecting device, said sensor means being operable to face said other reflector means and sense the movement of said last said reflected solar rays reflected onto said sensor means and produce second control signals representing the last said movement, said control means being operable to receive said second control signals and to cause said other reflector means to follow the movement of the sun, said solar ray collecting device being operable when shaded from the sun to receive reflected solar rays from said other reflector means, said control means being operable to receive said second control signals from said sensor means on said solar ray collecting device and to feed said second control signals to said second reflector means to cause said second reflector means to follow the sun, said control means being operable to selectively utilize said first or second control signals to cause said first or said other reflector means to follow the sun depending on the position of said first and said other reflecting means relative to the sun, said control means being operable to selectively terminate utilization of said second control signals and to operatively connect said sensor means to said operable means of said solar ray collecting device so that said operable means of said solar ray collecting device receives a sensor signal from said sensor means and utilizes said sensor signal to move said optical lenses of said solar ray collecting device to follow the sun, said control means being operable to terminate utilization of said second control signals when said solar ray collecting device is no longer shaded from the sun.

* * * * *